United States Patent [19]

Bruce

[11] 4,428,187

[45] Jan. 31, 1984

[54] JOINING SHACKLE OR LINK

[76] Inventor: Peter Bruce, Court View, 12 Mount Havalock, Douglas, Isle of Man

[21] Appl. No.: 261,154

[22] PCT Filed: Aug. 26, 1980

[86] PCT No.: PCT/GB80/00131
§ 371 Date: May 1, 1981
§ 102(e) Date: Apr. 23, 1981

[87] PCT Pub. No.: WO81/00607
PCT Pub. Date: Mar. 5, 1981

[30] Foreign Application Priority Data

Aug. 31, 1979 [GB] United Kingdom ............... 7930258

[51] Int. Cl.³ .............................................. F16G 13/06
[52] U.S. Cl. ............................................ 59/85; 59/86
[58] Field of Search ............................. 59/84, 85, 86, 87

[56] References Cited
FOREIGN PATENT DOCUMENTS
1219911 4/1959 France ...................... 59/85

Primary Examiner—Francis S. Husar
Assistant Examiner—David B. Jones
Attorney, Agent, or Firm—Mason, Fenwick & Lawrence

[57] ABSTRACT

A joining shackle or link is provided for joining link chain sections and comprises a link shaped assemblage of members including a detachable member or members enabling the joining link to be fitted on the chain sections. Opposed U-shaped parts (1,2) of the assemblage have abutting flanges (3) provided with wedge surfaces (4) and the assemblage is held together by couplers (5) which preload the wedge surfaces and the flanges. This preloading of the joining shackle enables the shackle to better withstand cyclic loading. Two separate U-members (1,2) are preferably present and provide opposed pairs of abutting flanges (3), and the couplers comprise half shells (6) fitting over mid-portions of the U-members and drawable together by screws (8) for preloading of the flanges.

14 Claims, 13 Drawing Figures

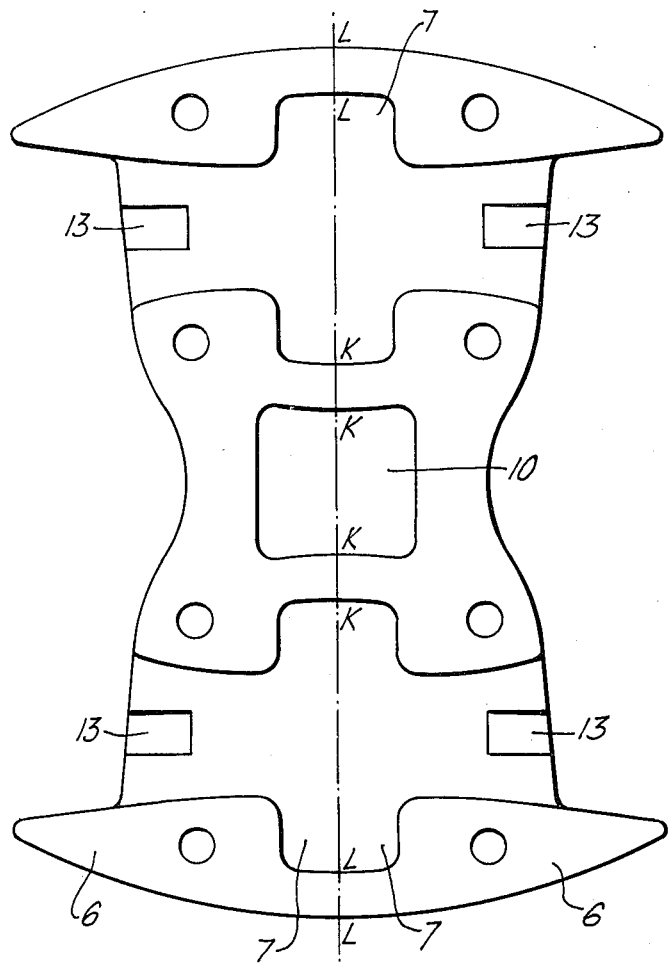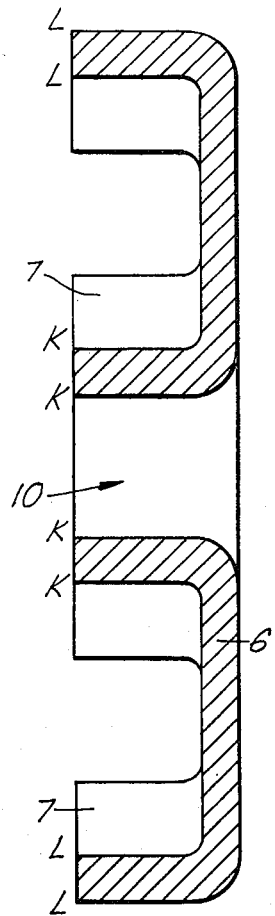

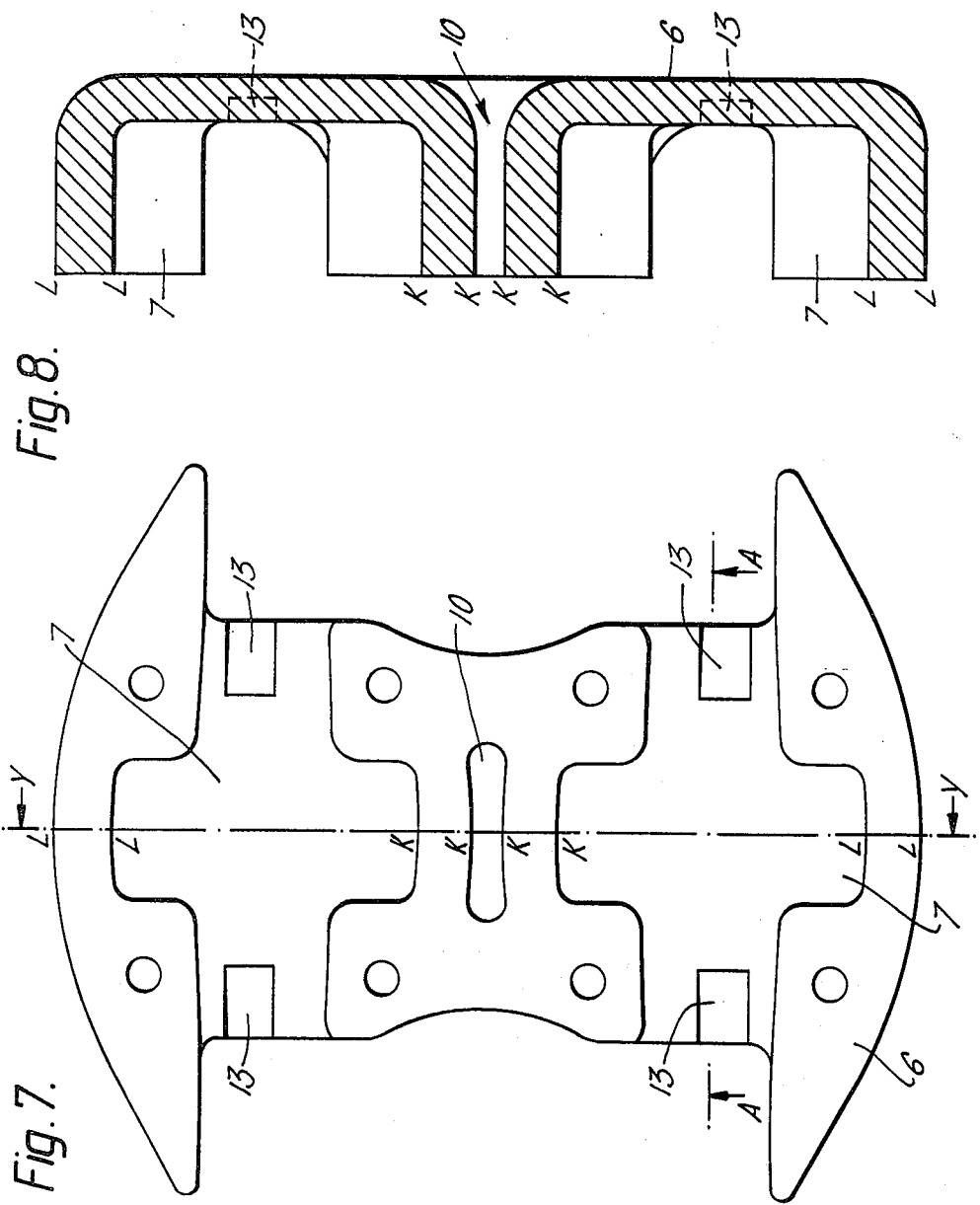

JOINING SHACKLE OR LINK

This invention is concerned with joining shackles or links for chain and, in particular, joining shackles for stud-link marine anchor chain.

Dismantlable joining shackles are known for joining chain and probably the most common type of joining shackle presently in use is the Kenter shackle comprising two interlocking machined C-shaped parts held in engagement by an interlocking central stud and a long taper pin through all three parts. Dimensional limitations imposed on the joining shackle to permit it to be inserted through the apertures in common links of stud-link chain and be compatible with Ships' deck machinery so constrains the design of the interlocking parts that only small radii can be employed in stress reducing fillets at internal section discontinuities. In consequence, high stress concentrations occur inside the assembled shackle at these fillets. This leads to failure under cyclic loading at a total number of cycles much less than that which cause failure of the common links of stud-link chain.

Fatigue tests in sea water have shown that a Kenter joining shackle has only one-third of the cyclic load life of corresponding common links of stud-link chain. For this reason, offshore drilling vessels have had no alternative for more than 15 years but to use continuous lengths up to 5,000 feet of stud-link chain for each anchor to avoid the known high incidence of fatigue failures of joining shackles in service.

It is an object of the present invention to provide an improved joining shackle or link obviating or mitigating the above disadvantages.

According to the present invention a chain joining link comprises a link shaped assemblage including, at least one detachable member which when detached permits fitting of the assemblage to end links of successive chain sections and which when fitted provides a secure link between the chain sections, said assemblage including at least one member provided with flanged ends adapted for preloading and which when assembled provide the link ends, other members defining coupling means for joining said flanged ends so that the flanged ends are preloaded in compression and the coupling means are preloaded in tension.

Preferably two facing flanged link ends of the members are arranged to co-operate with recess means in at least one clamp member, and wedge means are provided on at least two members arranged to expand the clamp member or members and compress the flanges when the link is assembled so that the joint is preloaded.

In a preferred embodiment, the joining link includes two U-links providing two pairs of facing flanged ends and joined by said coupling means, and the clamp member comprises a pair of half shells, fastening means being provided to draw said half shells together so as to preload the flanged ends and the half shells.

Preferably the clamp member is provided with threaded fastener means to permit pressure to be developed via the wedge means on the flanged members.

Preferably the operating surfaces of the wedge means are in the form of inclined surfaces machined at less than 5° and preferably less than 2° relative to a plane transverse to the plane of the link.

Preferably the sliding inclined surfaces of the wedge means are coated with a low friction coating.

Preferably the low friction coating is plated zinc giving a coefficient of static friction value less than 0.05.

Preferably water ingress to the surfaces of the joining link is prevented by suitable application of a sealant.

Preferably the link ends of the U-links taper towards the flanged ends.

Preferably an aperture is provided at the symmetry plane of each half shell so that a substantially equal distribution of stress is present in the clamp member adjacent the recesses for the flanged ends.

Embodiments of the present invention will now be described by way of example with reference to the accompanying drawings in which:

FIG. 3 shows a detailed inside view of one of the clamping shells of the joining link;

FIG. 4 shows a sectional end view of the shell of FIG. 3 through section Y—Y;

FIG. 7 shows an interior view of one of the clamping shells of the link of FIG. 5;

FIG. 8 shows a sectional end view of the shell through section Y—Y in FIG. 7

Figure 1:
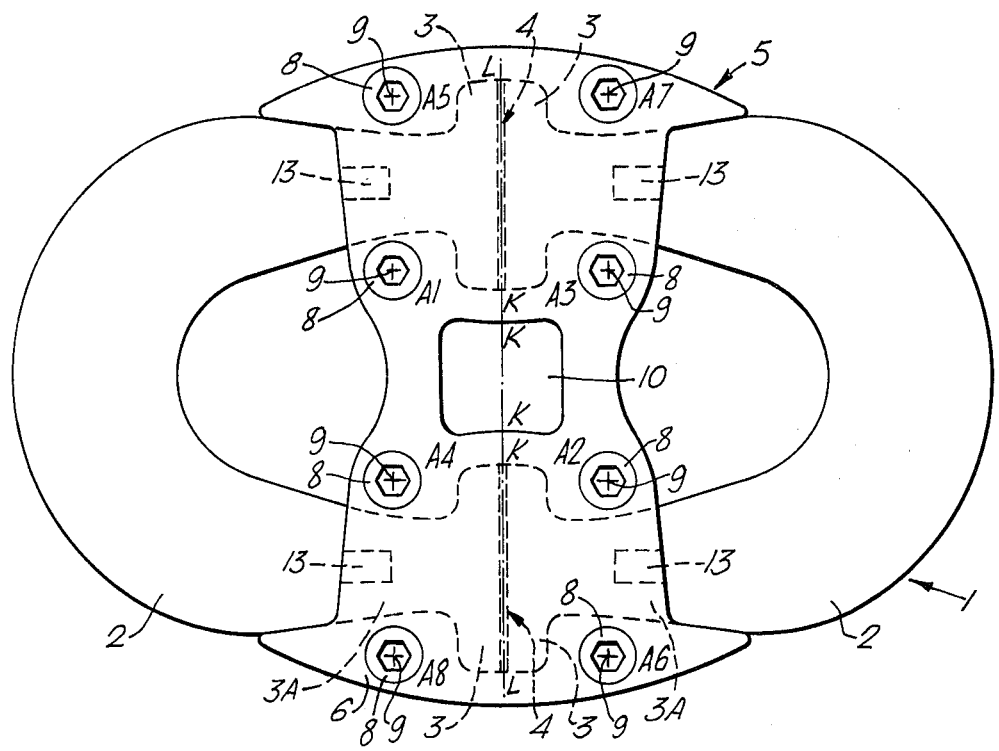
FIG. 1 shows a side view of a joining link for a link chain, according to the present invention.
Figure 2:
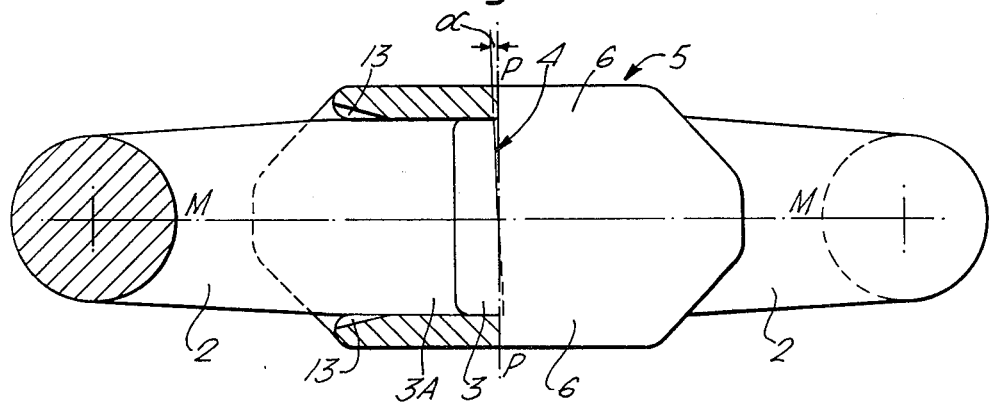
FIG. 2 shows a plan view, partly in section, of the joining link of FIG. 1.
Figure 5:
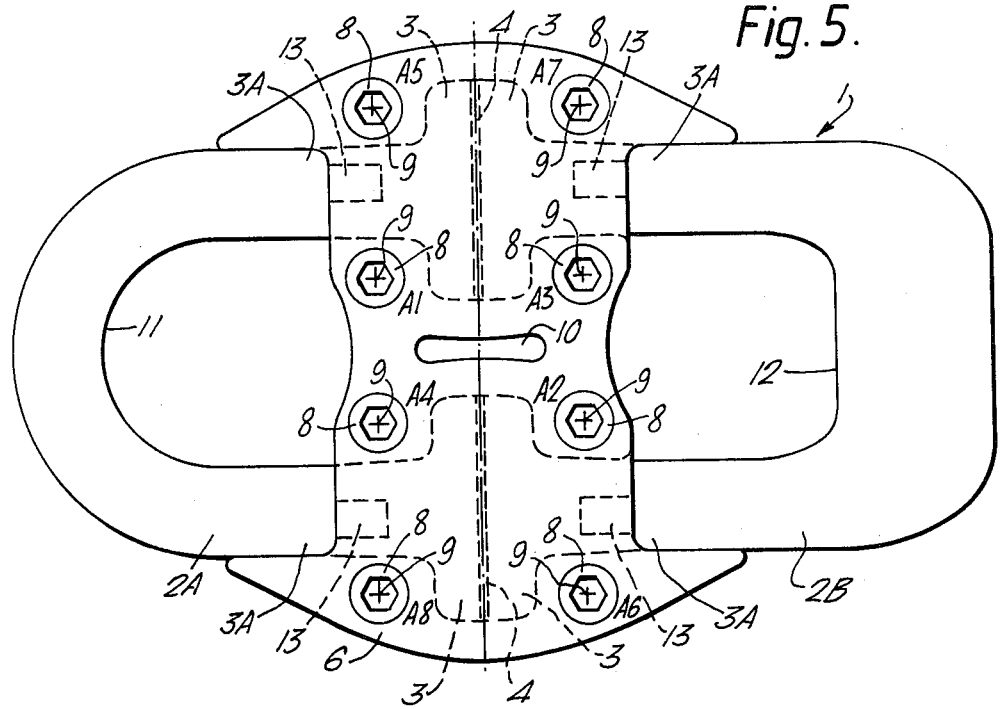
FIG. 5 shows a side view of a chain joining link, according to another embodiment of the present invention.
Figure 6:
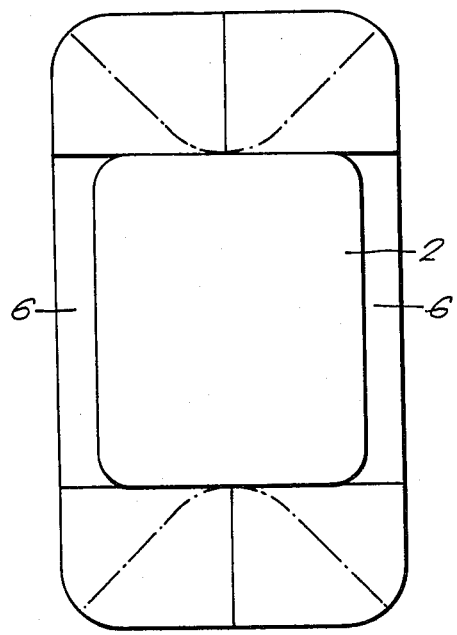
FIG. 6 shows an end view of the link of FIG. 5.
Figure 9:
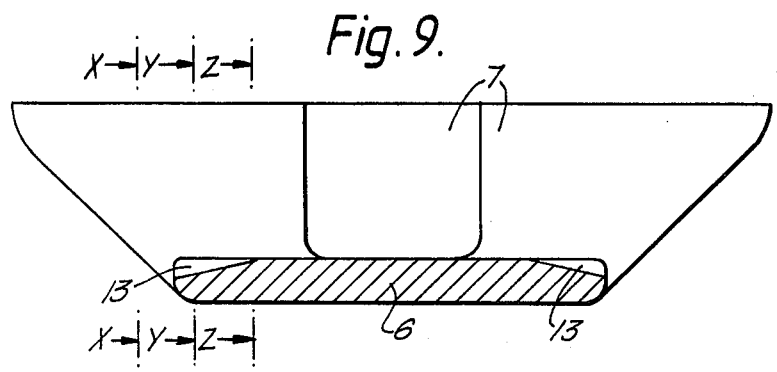
FIG. 9 is a sectional plan view of the shell through section A—A in FIG. 7.
Figure 10:
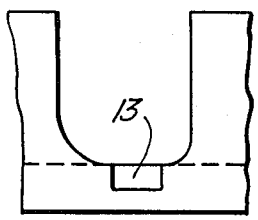
Figure 11:
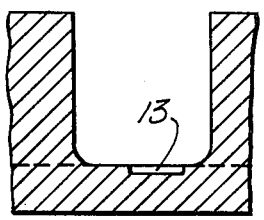
Figure 12:
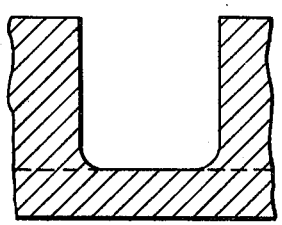
Figure 13:
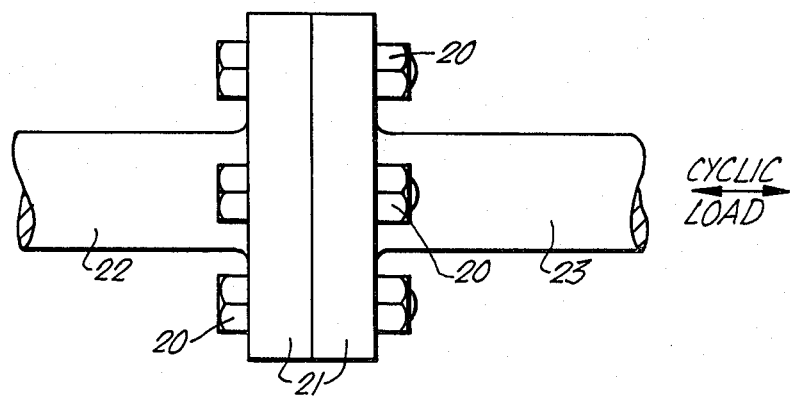

FIGS. 10 to 12 show sectional details X—X; Y—Y; Z—Z of FIG. 9; and;

FIG. 13 shows a standard bolted flanged joint.

Referring to FIGS. 1 to 4, a joining shackle 1 or link for chain sections, such as anchor chain sections, comprises a pair of identical U-members 2 arranged in facing relationship, and the facing ends of the U-members carry flanges 3. The facing and abutting surfaces 4 of the flanges 3 are laterally inclined slightly by an angle $\alpha$ (see FIG. 2) from a plane P—P which is normal to the mid plane M—M of the shackle 1 so that these surfaces 4 constitute lateral wedge surfaces. The angle $\alpha$ can have a value up to 5°, but $1\frac{1}{2}$° is preferable. The two U-members 2 are held together by clamping means 5 now described.

Thus, the clamping means 5 comprises a pair of facing half-shells 6 which fit over the positioned U-members 2 at a mid-location thereof, and each half-shell 6 includes recesses 7 (see FIG. 3) shaped to receive the abutting flanges 3 and the adjacent limb portions 3A so that each pair of abutting flanges 3 is accommodated in a housing defined by a pair of facing recesses 7 of the shells 6. The limbs 3A of the U-members 2 taper adjacent the flanges 3 so that the overall width of the clamping means 5 (see FIG. 2) can be maintained at a size meeting operational requirements of the shackle 1, e.g. enabling the link to pass through a hawse pipe (or hole) or fit between the whelps of a cable lifter or wildcat. The outer surfaces of the shells 6 are smoothly contoured to blend with the surfaces of the U-members 2.

The half-shells are clamped together by pairs of cap screws 8, each screw pair being associated with a respective limb with the screws of the pair on either side of the limb 3A at positions 9 to enable uniform drawing, so that eight screws 8, in all are present.

When the shells 6 are drawn together by tightening the screws 8 in the correct sequence ($A_1$ to $A_8$), the shells 6 react against the U-members 2 to move these members 2 into alignment and pressure reaction is created at the inclined wedge surfaces 4 of the flanges 3 to establish compression preload in these flanges 3 and tension preload in the coupling means 5.

Referring to FIG. 13 it is known that the bolts 20 of a standard bolted flanged joint 21 between shafts 22,23 can be given increased cyclic load fatigue capacity if the bolts 20 are preloaded in tension to hold the flanges 21 in compression when the shafts 22,23 have zero tensile loading. Cyclic tensile loading of the shafts 22,23 induce cyclic tensile loading in the bolts 20. However, if the static compressive preloading of the flanges 21 exceeds the peak tensile cyclic loading in the shaft 22,23 the bolts 20 will experience the cyclic loading of the shaft attenuated in the ratio of the spring constant (load per unit deflection) of the bolts 20 to the sum of the spring constants of the bolts 20 and the flanges 21. Thus, for bolts 20 having the same spring constant as the flanges 21, the cyclic loading in the bolts 20 will be half that in the shaft 22,23. Even greater attenuation of cyclic loading in the bolts 20 can be achieved if the spring constant of the bolts 20 in tension is considerably less than that of the flanges 21 in compression. The stress relieving fillets at the bolt heads can therefore be smaller in radius than those that would be necessary if preloading were not used. Alternatively, the stress and the likelihood of fatigue crack formation at existing bolt head fillets is greatly reduced by preloading.

The present shackle 1 utilises this principle of stress reduction at fatigue susceptible fillets by preloading which principle has not hitherto been applied to joining shackles because the dimensional limitations necessary to permit the shackle to be inserted through the apertures in common links of stud-link chain precludes the use of flanges and bolts of sufficient size to sustain the static breaking load of the common links.

Edges and corners of the flanges 3 and also of the half-shells 6 are suitably radiused to minimise stress concentration. Additionally an aperture 10 is provided centrally in each half-shell 6 such that the cross-sectional area of shell sections K—K and L—L on either side of the flange recess 7 is substantially equal to give a substantially uniform stress distribution in the half-shells 6 on either side of the flange recess 7.

Each of the sliding contact faces 4 between the U-members 2 and between shells 6 and U-members 2 are electroplated with zinc to a coating thickness of approximately 0.005 MM. This reduces the coefficient of lubricated static friction between the faces from 0.16 to 0.04 and correspondingly reduces the load in the set-screws 8 necessary to draw the shells together during assembly of the connector. The load reduction so achieved allows 16 MM to 18 MM set-screws to be used for a connector for 76 MM chain, where otherwise the screws needed would be too large for the room available in the connector shells.

During assembly, a coating of sealant compound is smeared over non-sliding faces between shells 6 and between shells 6 and the U-members 2 and also is smeared around the heads of the set-screws 8 to prevent ingress of sea water into the connector to corrode the machined internal surfaces and possibly produce fatigue crack initiating pitting of these surfaces.

The joining shackle 1 is coupled to adjacent chain sections by fitting the U-members 2 on respective link ends, of the sections, and then coupling the U-members by virtue of utilising the coupling means 5 so that the joint is preloaded as above described. The joined chain will be subjected to cyclic loading, the chain load being carried from one U-member 2 of the shackle to the other via the coupling means 5, but it is contended that stress concentrations in the joining shackle 1 due to this cyclic loading can be maintained within acceptable limits due to the preloading of the shackle 1 as explained above.

In a particular example for a 76 MM chain joining shackle, the recesses 7 have a width of 42.36 MM and the overall thickness of the mating flanges of the U-members 2 are made greater than the corresponding aperture width in the shells into which they are assembled by between 0.05 MM and 1.16 MM. The recesses therefor have a percentage reduction in width relative to the width of the corresponding flanges of just over 0.1 to 0.38 for the 0.05 MM and 0.16 MM differences. The $1\frac{1}{2}°$ inclined face angle $\alpha$ between flanges 3 permits almost complete assembly of the connecting link, without the set-screws 8 in place, leaving a separation between shells 6 of between 2 MM and 6 MM depending on machining tolerances achieved during manufacture. Insertion and turning of the set-screws 8 draws the shells 6 together and forces the U-members 2 to slide into alignment along the one and a half degree inclined faces 4 of the flanges 3. The shells 6 are forced to expand over the flanges 3 which, in turn, are compressed by the shells 6. Since the cross-sectional areas of the shells 6 and flanges 3 are chosen to give approximately equal spring constants in tension and compression. For cyclic tensile loads in the U-members 2 less than twice the static compressive preload in each flange pair 3 of between 70 tonnes and 210 tonnes (depending on tolerances), the cyclic tensile stress in the shells 6 is halved.

This allows cyclic loading of the shackle up to thirty percent of chain breaking load without separating the one and a half degree inclined faces 4 of the flanges 3 due to elastic stretching of the shells 6. The resulting fifty percent reduction of cyclic stresses in the shells 6 allows a relatively small internal fillet radius of 6 MM to be used within the shells. This, in turn, gives room in the connector for larger 8 MM fillet radii at the roots of the flanges 3 and so reduces the chance of early fatigue failure of the U-members 2 due to high stress concentration at the flange roots.

In the second embodiment of the present invention shown in FIGS. 5 to 12, a joining shackle 1 is provided for joining chain sections made in accordance with the applicant's U.K. Patent Specification No. 1574440. Thus in this case the two U-members 2 are not similar but one 2A has a concave part-cylindrical internal end surface 11 for mating with a complementary convex interior surface of the end link of one chain section while the other member 2B has a concave part-cylindrical internal end surface 12 for mating with a complementary concave surface of a chain link of the other section. The coupling means 5 are however almost exactly similar to those of the first embodiment and like parts carry like reference numerals. Since a chain according to specification No. 1574440 can be of reduced dimension, there is less restraint in the breadth dimension of the coupling means 5 and consequently each limb 3A of the U-members 2 can be of substantially uniform width rather than of marked tapering end form as in the first embodiment. Additionally, the central aperture 10 of the half-shells 6 ensuring uniform stress distribution will be of reduced size. The joining shackle of this embodiment functions in an exactly similar manner to that of the first embodiment.

To facilitate release of the half-shells from the U-members, wedge shaped recesses 13 can be provided in the shells 6, these recesses 13 serving to receive wedge elements (bars) which react against a respective U-member 2 for shell release. For dis-assembly of the joining shackle, wedge pieces are driven in between the shells and U-members at the recesses 13 provided following slackening off of the set-screws 8 until a gap of just over 3 MM appears between shells and the U-members. Two steel spacers 3 MM thick are then inserted between the shells 6 and the U-members 2 at each side of the shackle such that re-tightening of the set-screws 8 induces a high shearing force across the 1½° inclined faces 4 between the flanges 3 to break the joint between the U-members 2 and move them apart sideways 2 MM to 6 MM. This removes the preload in the joint and permits the shells 6 to be removed from the U-members 2 on slackening off and removing the set-screws 8.

The shells 6 are thus seen to act in the same manner as the bolts in a conventional preloaded flange joint but the setscrews 8 of the shells do not carry cyclic loading in the same manner.

Modifications are of course possible in the arrangements. For example two similar U-members (either 2A or 2B) could be used in the shackle of the second embodiment, either having convex internal ends 11 or concave internal ends 12. Additionally, the flanges 3 could be placed in the recesses 7 by expansion means other than the inclined surfaces 4 and set-screws 8.

I claim:

1. A chain joining link comprising a link-shaped assemblage providing opposed U-portions for retaining adjoining chain sections, the assemblage including a plurality of assemblable parts to enable the link to be fitted to the adjoining chain sections, at least one of said parts being provided with flange means while another of said parts is provided with recess means to receive said flange means during assembly of the link, the operative width of the recess means being less than the corresponding width of the flange means both measured when the link is in the unassembled state so that when the link is assembled with the flange means located in the recess means, the flange means maintain the recess means in an expanded condition whereby the flange means is subjected to a substantial preload in compression while the part containing the recess means is subjected to a substantial preload in tension.

2. A chain joining link comprising a link-shaped assemblage providing opposed U-portions for retaining adjoining chain sections, the assemblage including a plurality of assemblable parts to enable the link to be fitted to the adjoining chain sections, at least one of said parts being provided with flange means while another of said parts is provided with recess means to receive said flange means during assembly of the link, and expansion means to enable the flange means to be placed in the recess means; the operative width of the recess being less than the corresponding width of the flange means both measured when the link is in the unassembled state so that when the link is assembled with the flange means located in the recess means, the flange means maintain the recess means in an expanded condition whereby the flange means is subjected to a substantial preload in compression while the part containing the recess means is subjected to a substantial preload in tension.

3. A chain joining link according to claim 2, wherein the assemblage includes a pair of opposed U-members provided with flanged ends which when the link is assembled provides abutting flange pairs, the recesses for receiving the flange pairs being located in half shells serving to connect the U-members, fastening means being provided for retaining the half shells for assembly of the link, pressure reaction being created on the flange pairs by the half shells on assembly of the link to establish a substantial compression preload in the flange pairs and a substantial tension preload in the half shells, the expansion means co-operating with the half shells such that when the half shells are drawn together on assembly by the fastening means the half shells react against the abutting flange pairs to move the flanges into alignment.

4. A chain joining link according to claim 3, wherein the expansion means comprise abutting surfaces of the flange pairs, said abutting surfaces being inclined at a small angle (α) relative to a reference plane transverse and perpendicular to the mid-plane of the link so that the axial dimensions of the abutting surfaces of a flange pair, when not in alignment, may be shorter than or substantially equal to the corresponding width of the recess.

5. A chain joining link according to claim 3, wherein the fastening means comprises a plurality of bolts substantially uniformly distributed over the half shells.

6. A chain joining link according to claim 3, wherein the volume of the material of that portion of the half shells which lies over the flanges and is located to the outer side of the transverse mid-planes of the flange pairs is substantially equal to the volume of the material of that portion of the half shells which lies over the flanges and is located to the inner sides of said mid-planes.

7. A chain joining link according to claim 6, wherein an elongate aperture is present in a central part of each half shell to ensure that the said two volumes are substantially equal.

8. A chain joining link according to claim 3, wherein the flange at each end of a U-link comprises a pair of opposed flanged portions extending away from the link in a direction parallel to the said mid-plane.

9. A chain joining link according to claim 8, wherein each limb of a U-link converges towards the flange of the link to enable shell fastening bolts to be located in the half shell adjacent the flange.

10. A chain joining link according to claim 4, wherein the small inclined angle (α) of the abutting surfaces is less than 5° and preferably less than 2°.

11. A chain joining link according to claim 3, wherein the half shells abut when the link is in the assembled condition.

12. A chain joining link according to claim 3, wherein the expansion means are coated with a low friction coating to facilitate drawing together of the half shells during link assembly.

13. A chain joining link according to claim 2, wherein the width of the recess is smaller than the width of the corresponding flange or flange pair by an amount not less than about 0.1 percent of the flange width.

14. A chain joining link comprising a link-shaped assemblage providing opposed U-portions for retaining adjoining chain sections, the assemblage including a plurality of assemblable parts to enable the link to be fitted to the adjoining chain sections, at least one of said parts being provided with recess means while another of said parts is provided with flange means which are placed in said recess means by use of expansion means during assembly of the link, the operative width of the recess means being less than the corresponding width of the flange means both measured when the link is in the unassembled state so that when the link is assembled with the flange means located in the recess means, the flange means maintain the recess means in an expanded condition whereby the flange means is subjected to a substantial preload in compression while the part containing the recess means is subjected to a substantial preload in tension.

* * * * *